Figure 1:
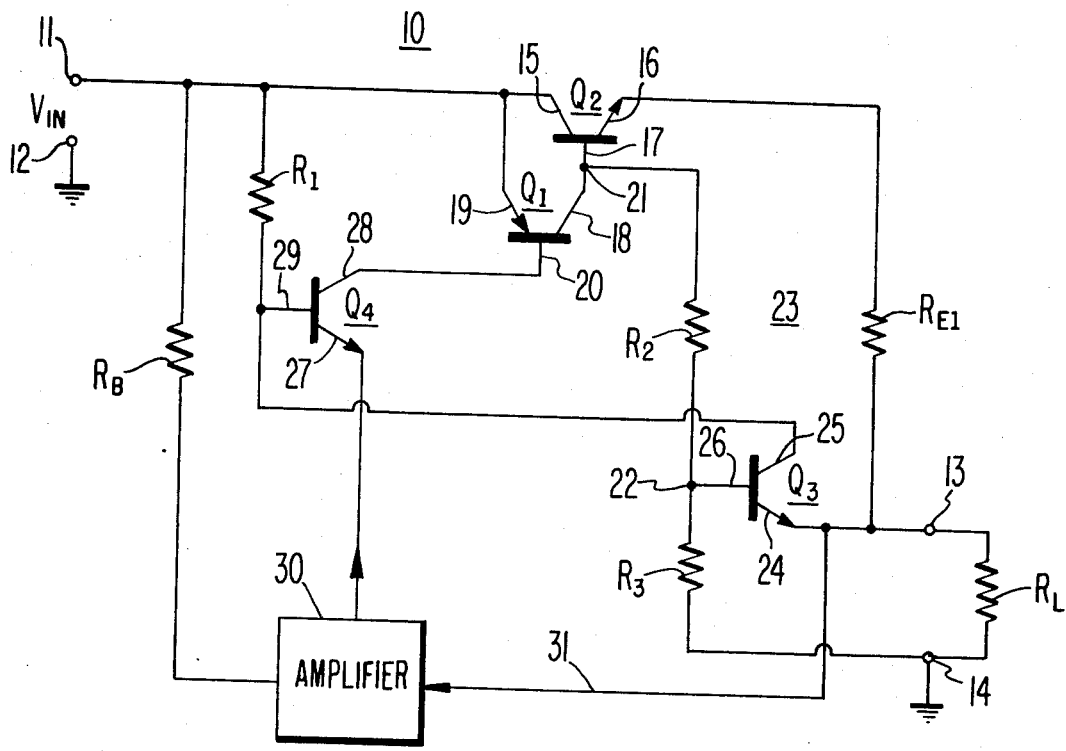

United States Patent [19]
Peterson

[11] 3,711,763
[45] Jan. 16, 1973

[54] OVERCURRENT PROTECTION CIRCUIT FOR A VOLTAGE REGULATOR

[75] Inventor: Walter Raymond Peterson, Belleville, N.J.

[73] Assignee: RCA Corporation

[22] Filed: Nov. 5, 1971

[21] Appl. No.: 196,021

[30] Foreign Application Priority Data

Feb. 1, 1971 Great Britain.....................3,604/71

[52] U.S. Cl.....................323/9, 317/22, 317/33 VR, 323/22 T, 323/38, 323/40
[51] Int. Cl..............................................G05f 1/58
[58] Field of Search..........323/4, 9, 20, 22 T, 38, 40; 317/22, 33 VR

[56] References Cited

UNITED STATES PATENTS

| | | | |
|---|---|---|---|
| 3,426,265 | 2/1969 | Till | 323/9 |
| 3,336,523 | 8/1967 | Rosenfeld | 323/22 T |
| 3,445,751 | 5/1969 | Easter | 323/38 X |
| 3,634,751 | 1/1972 | Miller | 323/9 |

*Primary Examiner*—Gerald Goldberg
*Attorney*—Edward J. Norton

[57] ABSTRACT

An overcurrent protection network for a voltage regulator including a bridge network in circuit with the regulating element and the output terminals, a normally non-conductive device in circuit with the bridge network and a variable impedance device in circuit with the regulating element and responsive to the normally non-conductive device for reducing the load current upon the occurrence of conditions which would tend to cause the load current to rise above a predetermined maximum value.

5 Claims, 2 Drawing Figures

PATENTED JAN 16 1973

3,711,763

INVENTOR.
Walter R. Peterson
BY
Edward J. Norton
ATTORNEY

OVERCURRENT PROTECTION CIRCUIT FOR A VOLTAGE REGULATOR

This invention relates to overcurrent protection circuits and more particularly to an overcurrent protection circuit for a regulated voltage power supply.

An overcurrent protection circuit of the type described herein is commonly known in the art as a foldback protection circuit. The term foldback relates to the current characteristic as seen at the load terminals of a power supply. When the current flowing through the load of a power supply tends to exceed a predetermined maximum value, the foldback circuit is rendered operative and reduces the current flow through the load.

In a typical prior art series voltage regulator utilizing a foldback protection scheme, there is usually a current sensing resistor in series circuit with the load. When the current through the sensing resistor tends to exceed a certain value, the foldback circuit is rendered operative and generally reduces the conduction of current through the series pass element.

The present invention provides several advantages over the typical prior art foldback protection circuit. One advantage of the present invention is an improved sensitivity for the initiation of the foldback operation. A second advantage of the present invention is that means are provided for protecting the drive circuitry for the voltage regulating element as well as the voltage regulating element.

In accordance with the present invention, there is provided an overcurrent protection circuit in a voltage regulator of the type having a pair of input terminals, a pair of output terminals and means for regulating the voltage appearing across the output terminals. The protection circuit comprises a bridge network connected in circuit with the regulating means and the output terminals. There is also provided a normally non-conductive device connected between one of the output terminals and one of the bridge terminals. This device is rendered conductive upon the occurrence of a current through the load which is greater than a certain maximum value. In addition, there is provided a variable impedance means which is connected in circuit with the voltage regulating means and the normally non-conductive device. The variable impedance means has a normally low operating impedance and is responsive to the conduction condition of the normally non-conductive device for providing a high impedance upon the occurrence of a load current above the certain maximum value.

Figure 2:
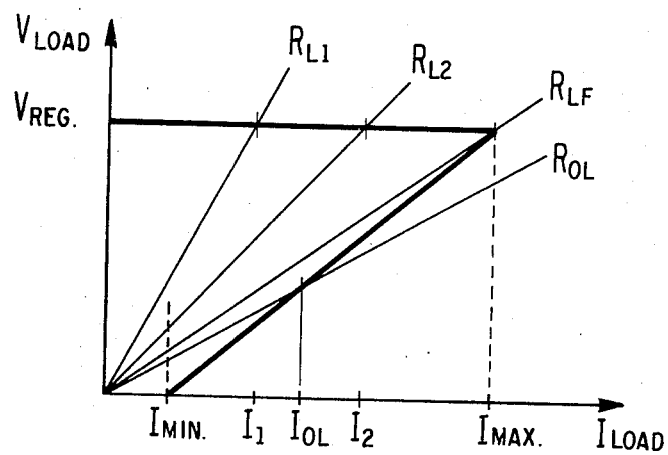

In the FIGS.:

FIG. 1 is a schematic diagram of a series voltage regulator including an embodiment of the present invention; and FIG. 2 is an idealized foldback characteristic for the embodiment of the invention shown in FIG. 1.

Referring now to FIG. 1, a series voltage regulator 10 is shown having a pair of input terminals 11 and 12 and a pair of output terminals 13 and 14. A source of unregulated voltage (not shown) is applied to the input terminals 11 and 12. A load which is designated as $R_L$ is connected between the output terminals 13 and 14. In the regulator 10 of FIG. 1, input terminal 12 and output terminal 14 are connected to a point of reference potential which is shown as ground.

The regulator 10 has a series pass transistor $Q_2$ having a collector electrode 15, an emitter electrode 16 and a base electrode 17. The series pass transistor $Q_2$ is driven from a driver transistor $Q_1$ having a collector electrode 18, an emitter electrode 19 and a base electrode 20. The emitter electrode of transistor $Q_1$ is electrically connected to the collector electrode of transistor $Q_2$. The common connection therebetween is electrically connected to the input terminal 11 of regulator 10. The collector electrode 18 of transistor $Q_1$ is connected to the base electrode 17 of transistor $Q_2$.

The emitter electrode 16 of the series pass transistor $Q_2$ is connected to one end of a ballast resistor $R_{E1}$. The other end of resistor $R_{E1}$ is connected to output terminal 13.

As previously stated, the load which may take any appropriate form and is shown schematically as a resistor $R_L$ is connected between the output terminals 13 and 14.

A resistor $R_2$ has a connection to the junction point 21, which is the junction between the collector electrode 18 of transistor $Q_1$ and the base electrode 17 of transistor $Q_2$. The other end of resistor $R_2$ is connected to the junction point 22.

Another resistor $R_3$ is connected between the junction point 22 and output terminal 14.

The last several connections have defined a four arm, four terminal bridge network 23. The four terminals of the bridge network 23 are junction points 21 and 22, and output terminals 13 and 14. The four arms of the bridge network 23 comprise: (a) resistor $R_2$; (b) resistor $R_3$; (c) the load $R_L$; and (d) the resistor $R_{E1}$ in series with the base to emitter junction of transistor $Q_2$.

Transistor $Q_3$, having an emitter electrode 24, a collector electrode 25 and a base electrode 26 is provided. The emitter electrode 24 of transistor $Q_3$ is connected to the output terminal 13. The base electrode 26 of transistor $Q_3$ is connected to the junction point 22 of the bridge network 23. The collector electrode 25 of transistor $Q_3$ is electrically connected to one end of a resistor $R_1$. The other end of resistor $R_1$ is connected to the input terminal 11 of the voltage regulator 10.

Another transistor $Q_4$ having an emitter electrode 27, a collector electrode 28 and a base electrode 29 is provided. The collector electrode 28 of transistor $Q_4$ is connected to the base electrode 20 of the driver transistor $Q_1$. The base electrode 29 of transistor $Q_4$ is electrically connected to the collector electrode 25 of transistor $Q_3$. The emitter electrode 27 of transistor $Q_4$ is electrically connected to an amplifier circuit 30.

The amplifier circuit 30 has input signals applied to it from the output terminal 13 via line 31. The signals appearing on line 31 are a representation of the signal waves appearing across the load $R_L$. Biasing is provided for the amplifier 30 via a resistor $R_B$ connected between the input terminal 11 and the amplifier 30.

In the normal regulating function of the series voltage regulator 10, an unregulated voltage $V_{IN}$ is applied between input terminals 11 and 12. The voltage appearing across the output terminals 13 and 14 is fed back via line 31 to the amplifier 30. Transistor $Q_4$ is normally operated in a saturated mode due to the copious supply of base current applied through the resistor $R_1$ to the base electrode 29 of transistor $Q_4$.

Transistor $Q_3$ is normally nonconductive during the normal voltage regulation function of the regulator 10. However, transistor $Q_3$ is kept on the verge of conduction by virtue of the voltages appearing at the base electrode 26 and the emitter electrode 24 thereof.

Should the voltage appearing across the load $R_L$ either increase or decrease from the desired or regulated value, the change in voltage will be sensed on line 31 and hence by the amplifier 30. Amplifier 30 will, in turn, supply the appropriate signal to the emitter electrode 27 of transistor $Q_4$. The signal supplied from amplifier 30 will cause the current through the collector to emitter path of transistor $Q_4$ to increase or decrease depending upon the load condition. This change in collector to emitter current of transistor $Q_4$ will affect the conduction of current through drive transistor $Q_1$, which will, in turn, affect the conduction of current through the series pass transistor $Q_2$.

Upon the occurrence of an event, such as, a short circuit across the load, which tends to increase the load current beyond a maximum value, the foldback operation will be initiated in the regulator 10. The bridge network 23 will be very sensitive to changes in the load current because of the inclusion of the base to emitter junction of transistor $Q_2$ in the arm of the bridge network 23 bounded by terminals 21 and 13. The sensitivity results from the fact that as the collector current of transistor $Q_2$, which is also the load current, increases, the base to emitter voltage of transistor $Q_2$ will also increase. The variation of collector current with base to emitter voltage is a non-linear function showing large changes of collector current for relatively small changes in base to emitter voltage. Thus, the sensitivity of this particular arm of the bridge network 23 will be more sensitive to changes than a simple sensing resistor arrangement.

When the normally nonconducting transistor $Q_3$ is rendered conductive, the base current for transistor $Q_4$ is diverted from the base electrode 29 of transistor $Q_4$ to the collector to emitter path of transistor $Q_3$.

Transistor $Q_4$, which is normally operating in a saturated condition, exhibits a low impedance during saturation. When transistor $Q_3$ is rendered conductive, the collector to emitter path of transistor $Q_4$ becomes a relatively high impedance as compared with its prior saturated condition. Transistor $Q_4$ is not completely cut off when transistor $Q_3$ is rendered conductive. The residual current flow through the collector to emitter path of transistor $Q_4$ is required so that the driver transistor $Q_1$ and the pass transistor $Q_2$ will not be cut off completely. It is important to prevent transistors $Q_1$ and $Q_2$ from being cut off in order to maintain the biasing conditions which will keep the entire foldback circuit, including transistors $Q_3$, $Q_4$, $Q_1$ and $Q_2$ in operation.

Thus, it will be seen that the insertion of a relatively high impedance prior to the driver transistor $Q_1$ will prevent excessive power dissipation and, therefore, protection for the drive transistor $Q_1$, the pass transistor $Q_2$ and the current carrying elements of amplifier 30 during an overcurrent condition.

Referring now to FIG. 2, it will be seen that the voltage appearing across the load terminals 13 and 14 will be maintained relatively constant at the regulated voltage for a range of load currents up to a maximum value. Once the maximum load current is exceeded, the foldback circuit previously described is rendered operative and the current is reduced down toward a minimum value dependent upon the value of the load $R_L$. FIG. 2, thus, shows the foldback characteristic for the embodiment of the invention shown in FIG. 1.

Superimposed upon the foldback characteristic of FIG. 2 is a family of load resistance values to help explain the operation of the circuit. When the load has a value of $R_{L1}$, the voltage appearing across the load will be the regulated voltage and the current through the load will have a value of $I_1$. Should the load resistance value decrease, that is, tending toward a short circuit to a value of $R_{L2}$, the voltage appearing across the load will still be the regulated output voltage; however, the current through the load will increase to a level $I_2$. Should the load resistance further decrease to a level designated $R_{LF}$ in FIG. 2, the maximum current through the load will occur and the foldback operation will start.

Should the load resistance decrease further to a value of $R_{OL}$, the foldback network will clamp the load current to a value of $I_{OL}$, that is, where the load line intersects the foldback characteristic. If the load is finally reduced to zero, only the minimum current, $I_{MIN}$, will flow through the load.

Thus, the invention shows a foldback circuit with increased sensitivity and provision for the protection of the driver elements, as well as the pass element.

What is claimed is:

1. An overcurrent protection circuit for a voltage regulator of the type having a pair of input terminals adapted for connection to a source of unregulated voltage, a pair of output terminals adapted for connection to a load and a series pass transistor having a control electrode and two main electrodes for regulating the voltage appearing across said pair of output terminals, said protection circuit comprising:

a bridge network including a first and second terminal and said pair of output terminals, said bridge network being connected in circuit with said regulating transistor; one arm of said bridge network including the junction between the control electrode and one main electrode said series pass transistor;

a normally nonconductive device connected between one of said output terminals and said first bridge terminals, said device being rendered conductive upon the occurrence of a current through said load tending beyond a certain maximum value; and a variable impedance means connected in circuit with said voltage regulating transistor and said device, said impedance means having a normally low operating impedance and being responsive to the conduction condition of said device to provide a high impedance upon the occurrence of said current beyond said maximum value.

2. The circuit according to claim 1 wherein said bridge network comprises a four arm network with the load included in one of said arms and a resistor included in each of said other arms.

3. An overcurrent protection circuit for a series voltage regulator of the type having a pair of input terminals adapted for connection to a source of unregulated voltage, a pair of output terminals adapted for connection to a load, a series pass transistor having a control electrode and two main electrodes for regulating the voltage appearing across said output terminals, said protection circuit comprising:

- a four arm bridge network including a first and second terminal and said pair of output terminals, said bridge network being connected in circuit with said series pass transistor, one arm of said bridge including the junction between the control electrode and one main electrode of said series pass transistor;
- a normally non-conductive transistor having a control electrode and two main electrodes, said control electrode being connected to said first terminal of said bridge network, one main electrode thereof being connected to one of said output terminals, said transistor being rendered conductive upon the occurrence of a current through said load tending beyond a certain maximum value; and
- a variable impedance means connected in circuit with said series pass transistor and the other main electrode of said transistor, said impedance means having a normally low operating impedance and being responsive to the conduction of current through the main electrodes of said normally non-conductive transistor to provide a high impedance upon the occurrence of said load current beyond said maximum value.

4. The circuit according to claim 3 wherein said variable impedance means comprises a second transistor having a control electrode and two main electrodes, said second transistor normally operating in a low impedance saturated condition, the control electrode of said second transistor being connected to the other main electrode of said normally non-conductive transistor, one main electrode of said second transistor being connected to said series pass element, said second transistor being rendered a high impedance upon the occurrence of said current beyond said maximum value.

5. An overcurrent protection circuit for a series voltage regulator of the type having a pair of input terminals adapted for connection to a source of unregulated voltage, a pair of output terminals adapted for connection to a load, a series pass transistor having a control electrode and two main electrodes, one main electrode thereof being connected to one of said input terminals, a driver transistor having a control electrode and two main electrodes, one main electrode of the driver transistor being connected to said one input terminal, the other main electrode of said driver transistor being connected to the control electrode of said series pass transistor, and an amplifying means connected in circuit with one of said output terminals and the control electrode of said driver transistor, said protection circuit comprising:

- a four arm bridge network having a first and second terminal and including said pair of output terminals, said second bridge terminal being connected to the control electrode of said series pass transistor, said bridge further comprising:
  - a. a first resistor connected between said first bridge terminal and said other output terminal,
  - b. a second resistor connected between said first and second bridge terminals,
  - c. a third resistor connected in series with said second bridge terminal, the junction between the control electrode and the other main electrode of said series pass transistor, and said one output terminal, and
  - d. said load connected between said pair of output terminals;
- a normally non-conductive transistor having a control electrode and two main electrodes, one main electrode thereof being connected to said one output terminal, the control electrode thereof being connected to said first bridge terminal; and
- a normally operated low impedance saturated transistor having a control electrode and two main electrodes, one main electrode thereof being connected to the control electrode of said driver transistor, the other main electrode thereof being connected to said amplifying means, and the control electrode thereof being electrically connected to said one input terminal and to said other main electrode of said normally non-conductive transistor;
- said normally non-conductive transistor being rendered conductive upon the occurrence of a current through said load tending above a certain value, said normally saturated transistor being rendered a high impedance upon the occurrence of said load current above said certain value.

* * * * *